United States Patent [19]
Komo

[11] Patent Number: 6,138,320
[45] Date of Patent: *Oct. 31, 2000

[54] WIPER PIVOT SHAFT AND WIPER APPARATUS

[75] Inventor: Yoshiyuki Komo, Toyohashi, Japan

[73] Assignee: Asmo Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/913,956

[22] PCT Filed: Mar. 8, 1996

[86] PCT No.: PCT/JP96/00584

§ 371 Date: Oct. 31, 1997

§ 102(e) Date: Oct. 31, 1997

[87] PCT Pub. No.: WO96/30238

PCT Pub. Date: Oct. 3, 1996

[30] Foreign Application Priority Data

Mar. 27, 1995 [JP] Japan ................................. 7-068374

[51] Int. Cl.[7] .................... B60S 1/24; B60S 1/18
[52] U.S. Cl. ................ 15/250.31; 15/250.3; 74/42; 384/415; 384/397
[58] Field of Search .............. 15/250.21, 250.27, 15/250.3, 250.31, 250.34, 250.29; 384/903, 415, 397; 74/42, 43, 51

[56] References Cited

U.S. PATENT DOCUMENTS

| | | | |
|---|---|---|---|
| 5,067,198 | 11/1991 | Ishikawa et al. | 15/250.34 |
| 5,234,269 | 8/1993 | Grillo et al. | 384/903 |
| 5,634,726 | 6/1997 | Edele et al. | 384/276 |
| 5,735,171 | 4/1998 | Moote et al. | 74/42 |

FOREIGN PATENT DOCUMENTS

| | | |
|---|---|---|
| 545128 | 8/1957 | Canada . |
| 3045395 | 7/1982 | Germany . |
| 60-88663 | 5/1985 | Japan . |
| 2-18761 | 2/1990 | Japan . |
| 4-113262 | 10/1992 | Japan . |
| 4-113263 | 10/1992 | Japan . |
| 4-113264 | 10/1992 | Japan . |
| 6-1050 | 1/1994 | Japan . |
| 3011446 | 3/1995 | Japan . |
| 7-251715 | 10/1995 | Japan . |

Primary Examiner—Gary K. Graham

[57] ABSTRACT

In a wiper apparatus of a vehicle, an intermediate support portion 14 of a wiper pivot shaft (10) is inserted into a pivot holder (12) fixed on a vehicle body and is thus supported. One side surface (23) of a flange portion (24), which is located between the support portion (14) and a link-lever-attaching portion (22) which is one end portion of the shaft (10), is opposed to one opening end of the pivot holder (12) to thereby determine the amount of insertion of the shaft (10). One end portion of the link lever (20) is press-fitted to the periphery of the link-lever-attaching portion (22). At this time, the link lever (20) abuts the other side surface (25) of the flange portion (24) to thereby determine the amount of press fit. One end portion of a wiper arm (32) is fitted to the periphery of a wiper-arm-mating portion (22) which is the other end portion of the shaft (10). Thus, the diameter of the link-lever-attaching portion (22) can be set appropriately, while the shaft has a necessary and sufficient strength as a whole. Also, high assembly accuracy is obtained.

12 Claims, 10 Drawing Sheets

PRIOR ART

WIPER PIVOT SHAFT AND WIPER APPARATUS

TECHNICAL FIELD

The present invention relates to a wiper pivot shaft used in the wiper apparatus of a vehicle or the like and to a wiper apparatus using the same.

BACKGROUND ART

A wiper apparatus is equipped with a wiper pivot shaft (shaft). The intermediate portion of the shaft is inserted into a pivot holder so that the shaft is rotatable supported. The pivot holder is fixed onto a vehicle body. A link lever is attached to one end portion of the shaft, while a wiper arm is attached to the other end portion of the shaft. A motor is connected to the link lever via a link mechanism, and a wiper blade is retained on the wiper arm. The link mechanism converts the rotary motion of the motor to the reciprocatively rotational motion (swinging motion) of the link lever. A reciprocatively rotational torque is transmitted to the shaft through the reciprocative rotation of the link lever, so that the shaft causes the wiper arm to reciprocatively rotate (swing) along a glass surface. As the wiper arm reciprocatively rotates, the wiper blade wipes the glass surface.

Figure 9A:
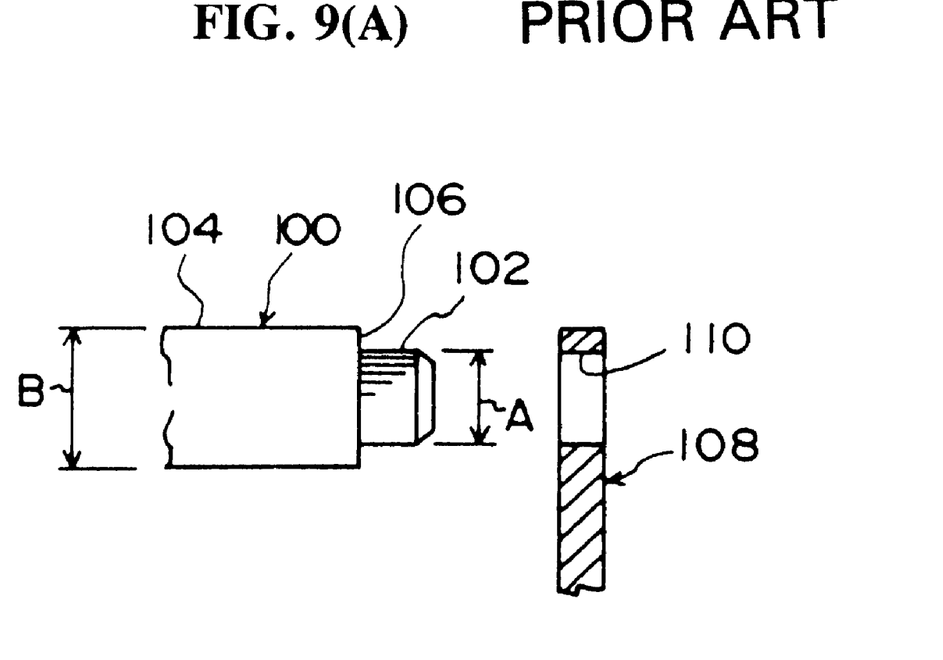
FIG. 9(A) is a front view showing the state before the link lever is attached to the one end portion of the shaft.
Figure 9B:
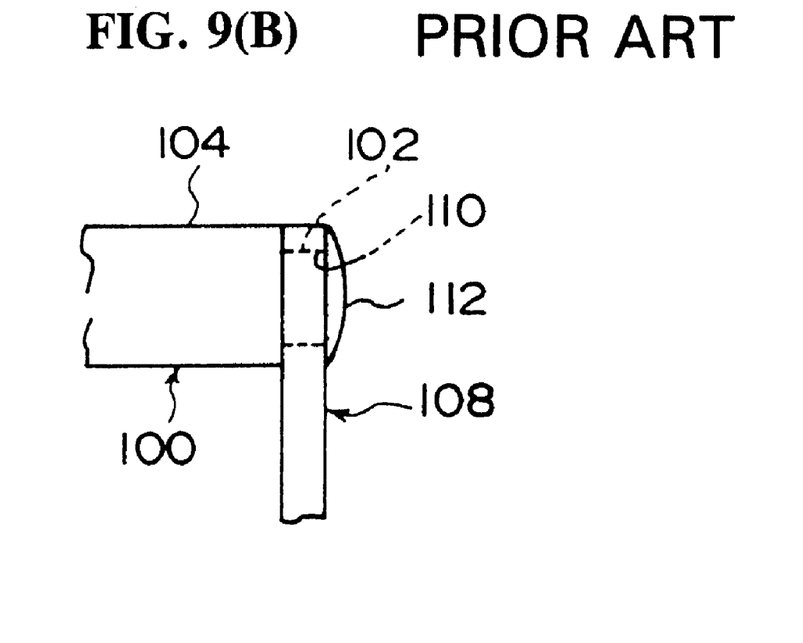
FIG. 9(B) is a front view showing the state that the link lever is attached to the one end portion of the shaft.

As shown in FIG. 9(A), a first end portion 102 of a shaft 100 has a smaller diameter and serves as a link-lever-attaching portion. A step 106 is formed between the first end portion 102 and an intermediate portion 104. The outer circumferential surface of the one end portion 102 is knurled. An engagement hole 110 is formed in a link lever 108 at one end portion thereof. As shown in FIG. 9(B), the link lever 108 is driven onto the first end portion 102 of the shaft 100, and the first end portion 102 is press-fitted into the engagement hole 110 until the hole edge portion of the link lever 108 abuts the step 106. After the press fit, the tip end of the first end portion 102 projecting from the engagement hole 110 is crimped (the crimped portion is denoted by numeral 112). Thus, the link lever 108 is attached to the one end portion 102 of the shaft 100.

Such a configuration is made public in Japanese Utility Model Application Laid-Open Nos. 4-113262, 4-113263, and 4-113264.

A large load is expected to be imposed on the wiper arm. The link lever 108 needs to obtain such an anti-slip torque (joining force) as not to slip with respect to the one end portion 102 of the shaft 100 within the expected range of load. A slip disables a wiper.

When the anti-slip torque is compared between different diameters A (knurl diameters A) of the one end portion 102 of the shaft 100, it is found that the larger the knurl diameter A is, the larger anti-slip torque is obtained. The knurl diameter A is set according to a required anti-slip torque.

On the other hand, when the step 106 located between the intermediate portion 104 and the first end portion 102 is small, the surface of contact between the step 106 and the link lever 108 becomes small. When the contact surface is small, the hole edge portion of the engagement hole 110 of the link lever 108 bites the intermediate portion 104 of the shaft 100 upon press fit of the link lever 108. As a result of this bite, the length of the intermediate portion 104 of the shaft 100 becomes short, and consequently the installed position of the link lever 108 becomes different from an expected position. That is, after the link lever 108 is press-fitted, the axial dimension of the shaft 100 is in danger of becoming different than what it was before the press-fitting.

Further, for assemblies of the shaft 100 and the link lever 108 obtained by press-fitting the shaft 100 into the link lever 108, the amount of the link lever 108 biting the intermediate portion 104 may differ, resulting in potential variations in the axial dimension of the shaft 100.

Thus, the step 106 must have such a size as to prevent such a problem.

However, when the knurl diameter A to be set is large, the diameter B of the intermediate portion 104 of the shaft 100 must also be made large; otherwise, the step 106 having a required size will not be secured. When the diameter B of the intermediate portion 104 of the shaft 100 is made large in order to secure the step 106 having a required size, the diameter B becomes unnecessarily large. As a result, the shaft 100 is unnecessarily overweighted at the intermediate portion 104 and is also unnecessarily strengthened.

Figure 10:
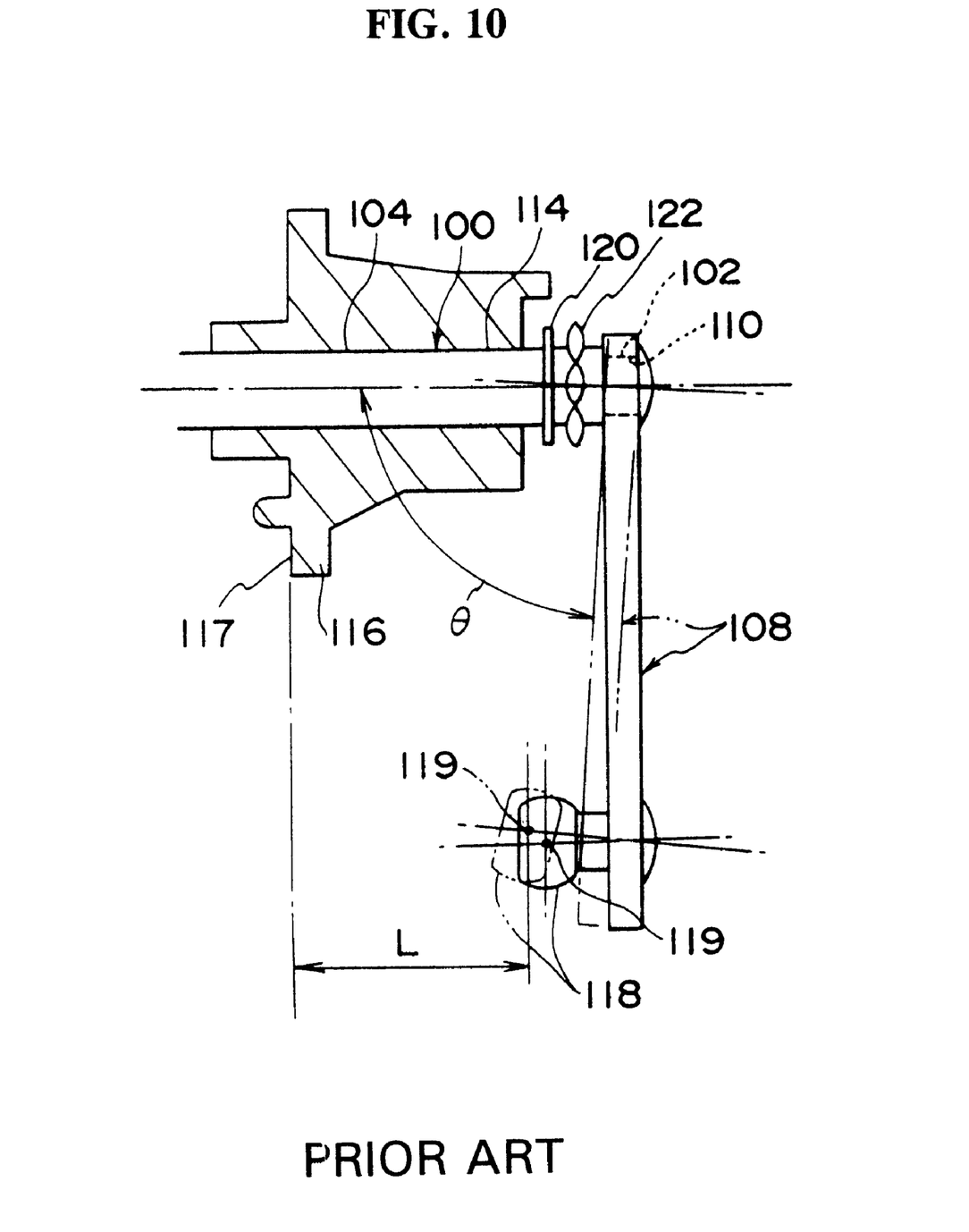
FIG. 10 relates to the prior art and is a partially sectioned front view showing the relation among a shaft, a link lever, and a pivot holder.

As shown in FIG. 10, when the step 106 is small, the step 106 fails to receive the link lever 108 in a proper posture upon press fit of the link lever 108, so that there arises a misalignment between the axis of the shaft 100 and the axis of the engagement hole 110. Thus, the link lever 108 fails to assume the posture represented by a solid line in FIG. 10, and inclines as represented by a two-dot-and dash line in FIG. 10, resulting in impaired perpendicularity of an angle θ between the link lever 108 and the shaft 100. When perpendicularity of the angle θ is impaired, the axis of the shaft 100 does not become parallel to the axis of a pivot 118, which is provided at an end portion of the link lever 108 opposed to the engagement hole 110 and is connected to the aforementioned link mechanism so as to reciprocatively rotate the link lever 108. Thus, as the link lever 108 rotates reciprocatively, there occurs an uneven sliding contact between one opening end of a pivot holder 114, into which the intermediate portion of the shaft 100 is inserted, and the link lever 108 opposed thereto. When this uneven sliding contact occurs, the anti-slide torque becomes unstable, and the thrust play of the shaft 100 also becomes unstable.

Also, when the link lever 108 inclines as represented by the two-dot-and-dash line in FIG. 10 with a resultant impairment of perpendicularity of the angle θ, there becomes unstable a dimension L between a mating surface 117 for attachment to a vehicle body of an attachment flange 116, which is formed on the periphery of the pivot holder 114 in order to fix the pivot holder 114 onto the vehicle body, and a pivotal point 119 of the pivot 118 of the link liver 108, resulting in a failure to obtain a predetermined wiping angle of a wiper arm 108.

Thus, a plain washer 120 and a wave washer 122 are interposed between the pivot holder 114 and the link lever 108 so as to stabilize the anti-slip torque and the thrust play of the shaft 100.

Japanese Utility Model Publication No. 3011446 introduces a shaft having a flange portion which contacts a link lever. However, the relation between the flange portion and a pivot holder is not considered at all.

DISCLOSURE OF THE INVENTION

In view of the foregoing fact, it is an object of the present invention to provide a wiper arm shaft allowing the diameter of the link-lever-attaching portion of the shaft to be set appropriately with the shaft having a necessary and sufficient strength as a whole and providing high assembly accuracy to thereby stabilize the axial dimension of the shaft without the axial dimension after attachment of a link lever to the shaft being made different from that before the attachment, as well as to provide a wiper apparatus.

The present invention is a wiper apparatus including:

a cylindrical pivot holder having an opening at both ends; a wiper pivot shaft having a support portion, a link-leverage attaching portion, a wiper-arm mating portion, and a flange portion, the support portion forming an intermediate portion of the shaft supported in the cylindrical pivot holder, and having a predetermined diameter D;

the link-lever attaching portion forming a first end portion of the shaft projecting from a first opening of the pivot holder, and having a predetermined diameter C greater than the predetermined diameter D of the support portion;

the wiper-arm mating portion forming a second end portion of the shaft projecting from a second open end of the pivot holder; and the flange portion is provided between the support portion and the link-lever attaching portion, and has a diameter greater than the diameter D of the support portion and the diameter C of the link-lever attaching portion, and projects perpendicularly to an axial direction of the shaft, and the first end surface of the flange portion at a link-lever attaching side portion is substantially flat and a second end surface of the flange portion is supported at the first opening of the pivot holder;

a link lever that abuts the flat end surface of the flange portion at the link lever attaching portion of the flange portion and which is fit onto a periphery of said link-lever attaching portion in order to transmit a reciprocatively rotational torque to said wiper shaft; and a wiper arm attached to said wiper arm mating portion so as to reciprocatively rotate together with the wiper pivot shaft.

According to the present invention, the link lever is fitted onto the outer peripheral surface of the link-lever-attaching portion of the shaft; the second end surface of the flange portion is supported at the first opening of the pivot holder to thereby determine the amount of insertion of the shaft into the pivot holder; and the flat lever attaching side portion of the flange portion abuts the link lever to thereby determine the amount of fit of the link lever.

For example, the link-lever-attaching portion is knurled, and the link lever is press-fitted thereto.

The diameter of the link-lever-attaching portion needs to be appropriately set so that the link lever obtains such an anti-slip torque (joining force) as not to slip with respect to the link-lever-attaching portion of the shaft, to thereby prevent the wiper from becoming disabled. In the present invention, even when the diameter of the link-lever-attaching portion to be set is large, the first end side surface of the flange portion which abuts the link lever can assume a sufficiently and appropriately large contact surface without increasing the diameter of the support portion of the shaft. Through securement of a sufficiently and appropriately large contact surface, when the link lever is attached to the shaft, the link lever can be prevented from biting the flange portion or the support portion, and the installed position of the link lever matches a previously set position along the axial direction of the shaft.

Accordingly, the diameter of the link-lever-attaching portion of the shaft can be set appropriately, while the shaft has a necessary and sufficient strength as a whole. Also, the axial dimension of the shaft can be stabilized without the axial dimension after attachment of a link lever to the shaft being made different from that before the attachment.

In addition, the following high assembly accuracy is obtained.

That is, the other side surface of the flange portion capable of securing a sufficiently large contact surface receives the link lever in a proper posture when the link lever is fitted. Thus, a high degree of perpendicularity is obtained for the angle θ between the link lever and the shaft. Also, the flange portion has a strength against press fit of the shaft into the link lever, so that the one side surface of the flange portion does not vary dimensionally in the axial direction. This prevents uneven sliding contact on the link lever side of the pivot holder, i.e. between the one opening end of the pivot holder and the one side surface of the flange portion opposed thereto. Accordingly, the anti-slide torque is stabilized, and the thrust play of the shaft is also stabilized. As a result, there is no need to interpose a wave washer or the like on the link lever side of the pivot holder, i.e. between the one opening end of the pivot holder and the one side surface of the flange portion opposed thereto.

In addition to attainment of a high degree of perpendicularity for the angle θ, the other side surface of the flange portion abuts the link lever to thereby determine the amount of fit of the link lever 20, and the one side surface of the flange portion is opposed to the one opening end of the pivot holder to thereby determine the amount of insertion of the shaft. Thus, the axial dimension of the shaft between the pivot holder and the link lever is accurately stabilized, so that the wiping angle of the wiper arm can assume a predetermined angle.

BRIEF DESCRIPTION OF DRAWINGS

FIG. 4 and shows wiper pivot shafts according to the first embodiment having link-lever-attaching portions of different diameters, wherein

FIG. 9 shows prior art and shows a wiper pivot shaft and a link lever to be attached to one end portion thereof, wherein

BEST MODE FOR CARRYING OUT THE INVENTION

A wiper pivot shaft and a wiper apparatus according to the present invention will now be described in detail with reference to the appended drawings.

First, a first embodiment will be described with reference to FIGS. 1 to 4.

Figure 1:
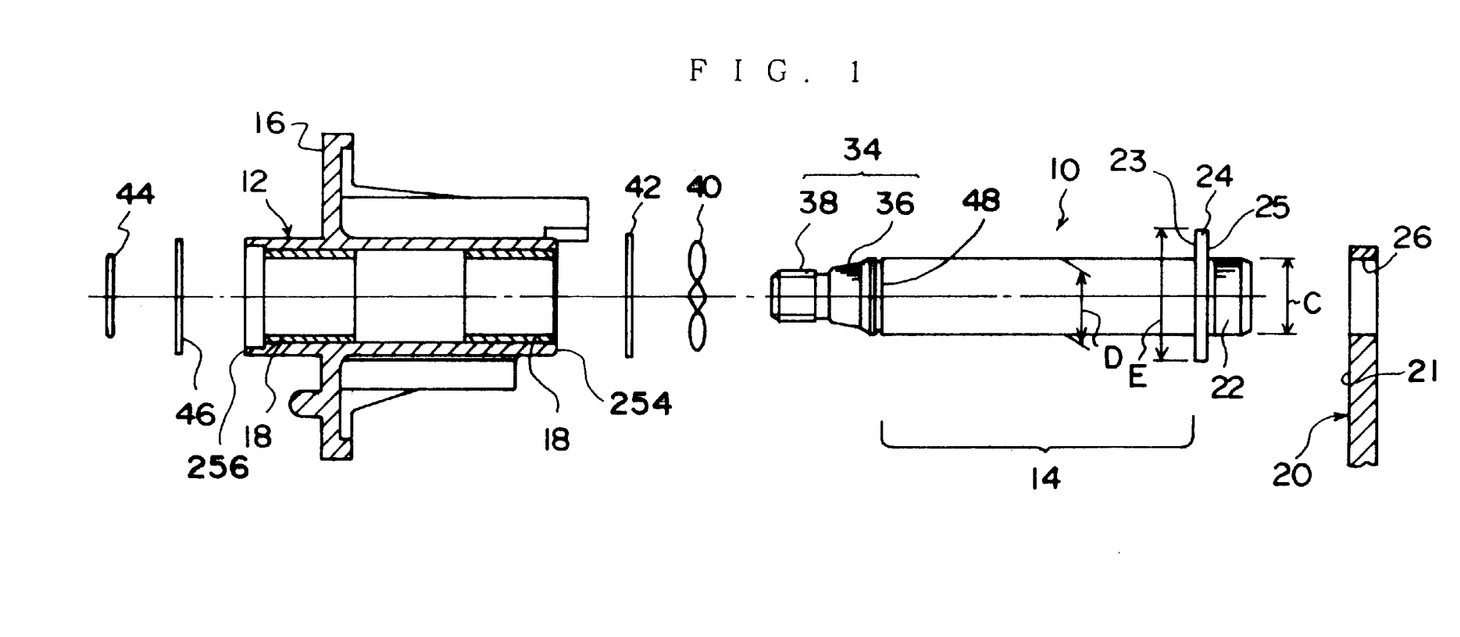
FIG. 1 depicts to a first embodiment of a wiper pivot shaft and a wiper apparatus of the present invention and is a partially sectioned and exploded front view of the main portion thereof.
Figure 2:
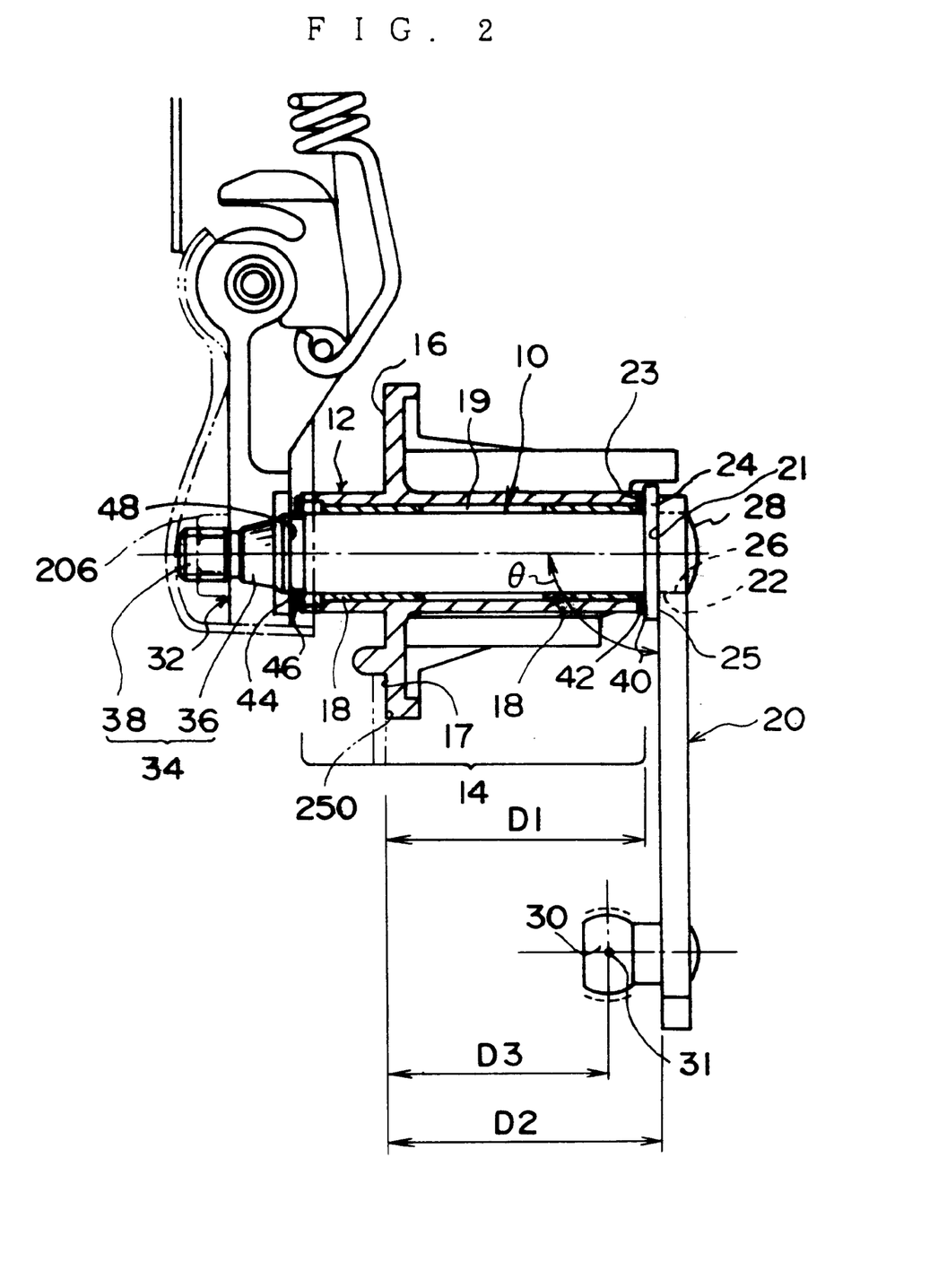
FIG. 2 is a partially sectioned front view of the first embodiment showing the assembled state of the main portion thereof.

As shown in FIGS. 1 and 2, the wiper apparatus of a vehicle has a wiper pivot shaft (hereinafter, referred to as a shaft) 10. The intermediate portion (a support portion 14) of the shaft 10 is inserted into a pivot holder 12, and the shaft 10 is thus supported. The pivot holder 12 is cylindrically formed. An attachment flange 16 is projectingly formed on the outer circumferential surface of the pivot holder 12 and is fixedly attached onto a vehicle body 250 through use of a bolt or the like. A pair of sleeves 18 are interposed between the inner circumferential surface of the pivot holder 12 and the outer circumferential surface of the shaft 10. Both the sleeves 18 are located opposingly apart from each other in the axial direction of the shaft 10. The outer circumferential surface of the support portion 14 of the shaft 10 slidably contacts the inner circumferential surfaces of the sleeves 18, so that the shaft 10 is rotatable.

The slidably contacting outer circumferential surface of the shaft 10 is lubricated with grease. The gap between the outer circumferential surface of the support portion 14 and the inner circumferential surface of the pivot holder 12 located between the opposed ends of the sleeves 18 serves as a grease pocket (lubricating fluid pocket). In the case where the shaft 10 is made of a metal, and the pivot holder 12 is also made of a metal, the sleeves 18 are made of a synthetic resin. Thus, the outer circumferential surface of the support portion 14 of the shaft 10 slidably contacts the inner circumferential surfaces of the sleeves 18, so that sliding contact is made between a part made of a metal and a part made of a synthetic resin to thereby reduce wear or the like which would be induced from sliding contact between metallic parts. In the case where the shaft is made of a metal and the pivot holder 12 is made of a synthetic resin, sliding contact between metallic parts can be prevented even if the outer circumferential surface of the shaft 10 is brought in direct sliding contact with the inner circumferential surface of the pivot holder 12. Therefore, the sleeves 18 are unnecessary so long as the prevention of sliding contact between metallic parts is concerned.

A first end portion (a link-lever-attaching portion 22) of the shaft 10 projects from a first opening 254 of the pivot holder 12, and the link lever 20 is attached thereto. The outer circumferential surface of the link-lever-attaching portion 22 is knurled. A flange portion (flange-shaped portion) 24 is integrally provided on the shaft 10 between the link-lever-attaching portion 22 and the support portion 14, the flange portion 24 having a diameter larger than those of both the portions. An engagement hole 26 is formed in one end portion of the link lever 20. A second end surface 23 of the flange portion 24 is supported at the first opening of the pivot holder 12. The shaft is inserted from the other end portion thereof into the pivot holder 12 through the one opening end of the pivot holder 12. The link lever 20 is driven onto the link-lever-attaching portion 22, and thus the link-lever-attaching portion 22 is press-fitted into the engagement hole 26, so that the link lever 20 is fitted onto the periphery of the link-lever-attaching portion 22. During this press fit, the link-lever-attaching portion 22 is press-fitted into the engagement hole 26 until the hole edge portion of the engagement hole 26 of the link lever 20 abuts the flat end surface 25 on the link-lever-attaching side of the flange portion 24. Thus, the amount of fit (the amount of press fit) of the link lever 20 onto the link-lever-attaching portion 22 is limited. The tip end of the link-lever-attaching portion 22 projecting from the engagement hole 26 is crimped (the crimped portion is denoted by numeral 28 in FIG. 2).

Figure 3:
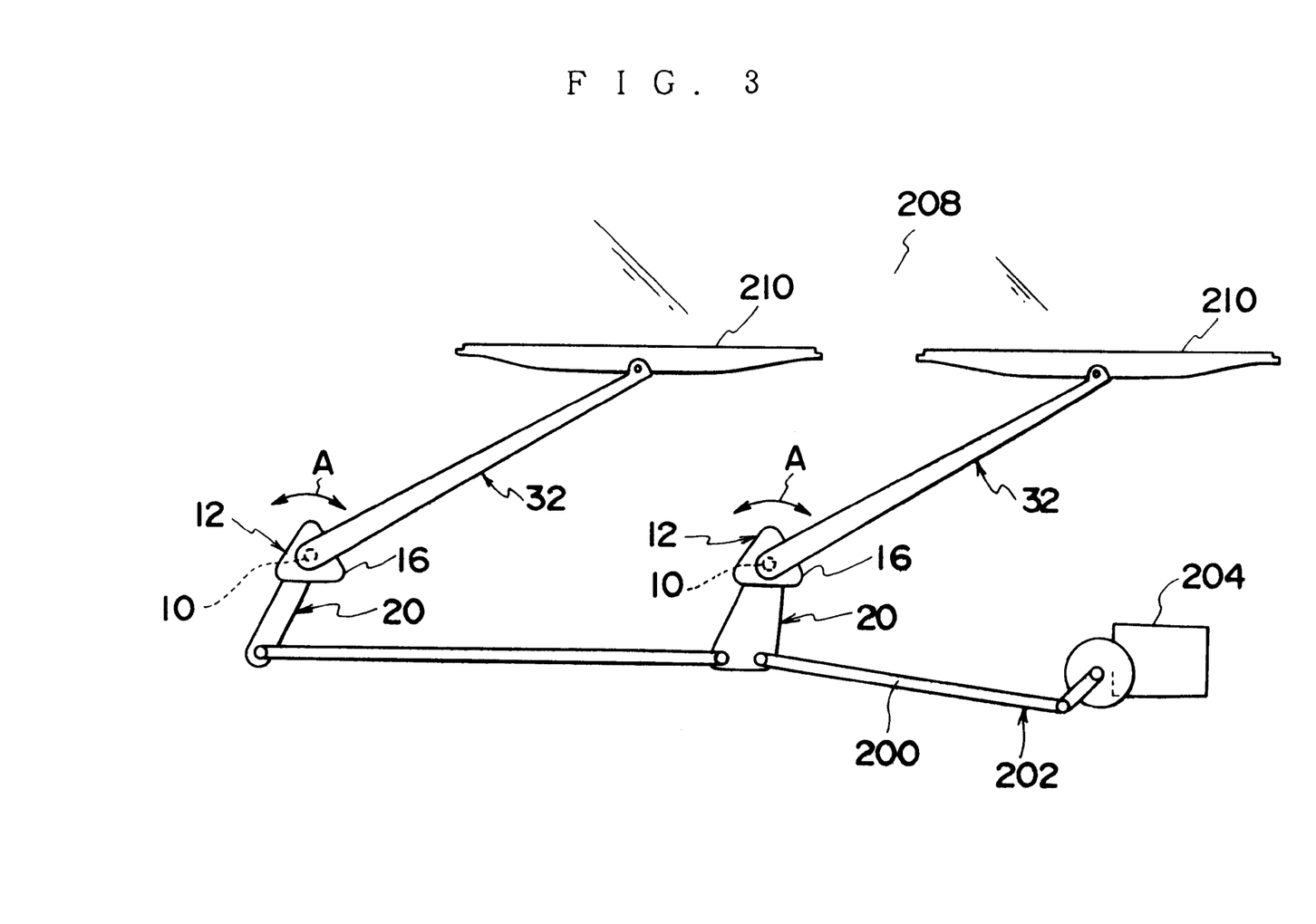
FIG. 3 is a schematic configurational view showing a wiper apparatus of the present invention.

As shown in FIG. 3, a pivot 30 (see also FIG. 2), on which a link 200 is pivoted, is projectingly provided at the other end portion of the link lever 20 on a side surface 21 facing the side of the flange portion 24. A motor 204 is connected to the link lever 20 via a link mechanism 202 including the link 200. The link mechanism 202 converts the rotary motion of the motor 204 to the reciprocatively rotational motion (swinging motion) of the link lever 20 with the shaft 10 serving as a reciprocative rotational shaft (swinging shaft).

When the link lever 20 is attached to the link-lever-attaching portion 22, the link lever 20 is connected to the link-lever-attaching portion 22 such that the link lever 20 can transmit a reciprocatively rotational torque to the link-lever-attaching portion 22 as the link lever 20 makes a reciprocatively rotational motion.

As shown in FIG. 2, the other end portion (a wiper-arm-mating portion 34) of the shaft 10 projects from a second opening 256 of the pivot holder 12. A wiper arm 32 is attached to the projecting wiper-arm-mating portion 34. The wiper-arm-mating portion 34 has a taper portion 36, which is located on the side of the support portion 14 and tapers off toward the side opposite to the support portion 14, and an external thread portion 38, which is formed on the side opposite to the support portion 14. The outer circumferential surface of the taper portion 36 is knurled. The base end portion of the wiper arm 32 is fitted to the taper portion 36, and a nut 206 is screw-engaged with the external thread portion 38 to thereby fasten the base end portion of the wiper arm 32. Thus, the wiper arm 32 is connected to the wiper-arm-mating portion 34 so as to be reciprocatively rotatable together with the shaft 10. As shown in FIG. 3, the wiper arm 32 is reciprocatively rotated (swung) along a glass surface 208 of the vehicle in the directions of arrow A. As shown in the same figure, a wiper blade 210 is retained to the wiper arm 32, so that the glass surface 208 is wiped by the wiper blade 210 as the wiper arm 32 rotates reciprocatively.

For the shaft 10, a wave washer (wave washer), together with a plain washer 42, is interposed between the one opening end of the pivot holder 12 and the flange portion 24. The wave washer 40 is located on the side of the flange portion 24, while the plain washer 42 is located on the side of the pivot holder 12. The flange portion 24 abuts the first opening of the pivot holder 12 via the wave washer 40 and the plain washer 42 to thereby determine the amount of insertion of the shaft 10 into the pivot holder 12. Also, the wave washer 40 limits the axial movement of the shaft 10.

Also, an engagement groove 48 is formed in the shaft 10 between the support portion 14 and the wiper-arm-mating portion 34. A C-ring (retaining ring) 44 serving as a retaining member is fitted into the engagement groove 48. A plain washer 46, through which the shaft 10 is inserted, is interposed between the C-ring 44 and the second opening of the pivot holder 12. The C-ring 44 abuts the second opening of the pivot holder 12 via the pivot holder 12 to thereby prevent the shaft 10 from coming off.

According to the above-described configuration, the link lever 20 is driven by the motor 204 and is reciprocatively rotated via the link mechanism 202. Also, a reciprocatively rotational torque is transmitted from the link lever 20 to the shaft 10, and thus the wiper arm 32 is reciprocatively rotated, so that the wiper blade 210 wipes the glass surface 208.

When the link lever 20 is attached to the link-lever-attaching portion 22 of the shaft 10, the link lever 20 is driven onto the link-lever-attaching portion 22 until the link lever 20 abuts the flat end (first end); surface 25 of the flange portion 24. Thus, the link-lever-attaching portion 22 is press-fitted into the engagement hole 26 of the link lever 20 and is then crimped. At this time, the first end surface 25 of the flange portion 24 receives a pressing force associated with the press fit and crimping.

Figure 4A:
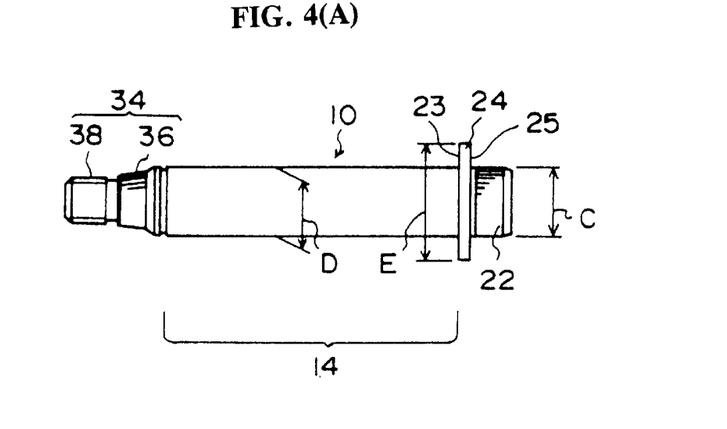
FIG. 4(A) is a front view of the case where the diameter of the link-lever-attaching portion is identical to that of the support portion, FIG. 4 (B) is a front view of the case where the diameter of the link-lever-attaching portion is smaller than that of the support portion.
Figure 4B:
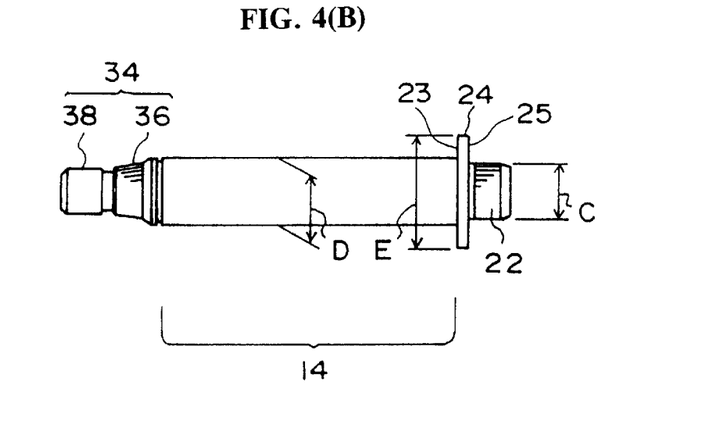
Figure 4C:
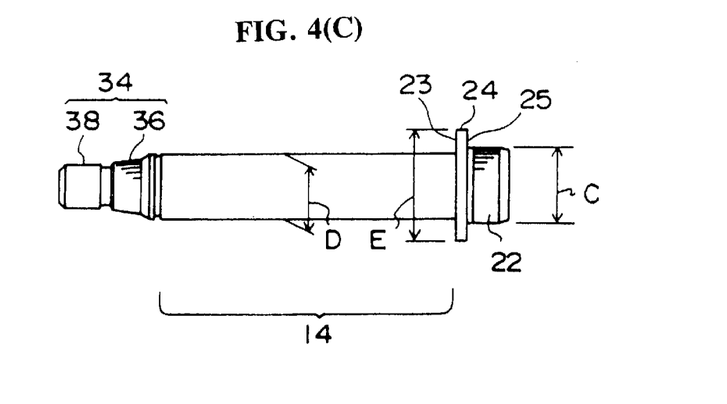
FIG. 4(C) is a front view of the case where the diameter of the link-lever-attaching portion is greater than that of the support portion.

Diameter E of the flange portion 24 is rendered larger than both diameter D of the support portion 14 and diameter C of the link-lever-attaching portion 22. When the diameter (knurl diameter) C of the link-lever-attaching portion is smaller than the diameter D of the support portion 14 (when C<D, particularly, when their difference is small) as shown in FIG. 4(B), or when the diameter C of the link-lever-attaching portion 22 is identical to the diameter D of the support portion 14 (when C=D) as shown in FIG. 4(A), or further when the diameter C of the link-lever-attaching portion 22 is larger than the diameter D of the support portion 14 (C>D) as shown in FIG. (C), the diameter E of the flange portion 24 can be rendered sufficiently larger as compared with the diameter C of the link-lever-attaching portion 22, to thereby render the first end surface 25 of the flange portion 24 large.

On the other hand, a large load is expected to be imposed on the wiper arm 32. Thus, the diameter C of the link-lever-attaching portion 22 must be set such that even in such a case, the link lever 20 obtains such an anti-slip torque (joining force) as not to slip with respect to the link-lever-attaching portion 22, to thereby prevent the wiper from becoming disabled.

According to the present embodiment, even when the diameter C of the link-lever-attaching portion 22 to be set is large, the contact surface of the flange portion 24 with the link lever 20 can be rendered sufficiently and appropriately large without increasing the diameter D of the support portion 14 of the shaft 10. Through securement of the sufficiently and appropriately large contact surface, when first end surface 25 of the flange portion 24 receives a pressing force associated with press fit and crimping, the link lever 20 can be prevented from biting the flange portion 24 or the support portion 14. Thus, the amount of press fit accurately matches a predetermined amount of press fit. Accordingly, the installed position of the link lever 20 highly accurately matches a predetermined set position along the axial direction of the shaft 10.

Accordingly, the diameter C of the link-lever-attaching portion 22 of the shaft 10 can be set appropriately, while the shaft 10 has a necessary and sufficient strength as a whole. Also, the axial dimension of the shaft 10 can be stabilized without the axial dimension after attachment of the link lever 20 to the shaft 10 being made different from that before the attachment.

In addition, the following high assembly accuracy is obtained.

That is, the first end side surface 25 of the flange portion 24 capable of securing a sufficiently large contact surface receives the link lever 20 in a proper posture when the link lever 20 is press-fitted. Thus, the axis of the shaft 10 and the axis of the engagement hole 26 of the link lever 20 align with each other, so that a high degree of perpendicularity is obtained for the angle θ between the link lever and the shaft. Through attainment of a high degree of perpendicularity for the angle θ, the axis of the shaft 10 accurately parallels the axis of the pivot 30 of the link lever 20. Accordingly, so long as the first opening of the pivot holder 12 and the second end surface 23 of the flange portion 24 are respectively perpendicular to the axial direction, uneven sliding contact is prevented between the first opening of the pivot holder 12 and the second end surface 23 of the flange portion 24 opposed thereto via the wave washer 40 and the plain washer 42. Accordingly, the anti-slide torque is stabilized, and the thrust play of the shaft 10 is also stabilized.

Also, since the amount of insertion of the shaft 20 is determined through abutment of the second end surface 23 of the flange portion 24 against the first opening of the pivot holder 12 via the wave washer 40 and the plain washer 42, there becomes constant an axial dimension D1 of the shaft 10 between a mating surface 17 of the attachment flange 16 of the pivot holder 12 for attachment to the vehicle body 250 and the second end surface 23 of the flange portion 24. Also, the amount of driving the link lever 20 (amount of press fit) is stably determined through abutment of the link lever 20 against the first end surface 25 of the flange portion 24, so that there becomes constant an axial dimension D2 of the shaft 10 between the mating surface 17 of the attachment flange 16 and the side surface 21 of the link lever 20 facing on the side of the flange portion 24. The dimensions D1 and D2 are rendered constant, and an axial dimension D3 of the shaft 10 between the mating surface 17 of the attachment flange 16 and a pivotal point 31 of the pivot 30 of the link lever 20 is stabilized to a previously set dimension. Thus, a predetermined wiping angle of the wiper arm 32 can be obtained.

The shaft 10 can not only be integrally machined through cutting but also be cold-forged. Through employment of cold forging, raw material can be of a small diameter corresponding to the diameter D of the support portion 14, not a large diameter corresponding to the diameter E of the flange portion 24. The support portion 14, the flange portion 24, and the link-lever-attaching portion 22, which respectively have predetermined diameters, can be integrally manufactured from the raw material, thereby realizing a reduction in cost.

Thus, the wiper apparatus attains high assembly accuracy.

Next, a second embodiment will be described with reference to FIGS. 5 and 6.

In the present embodiment, the shaft 10 is made of a metal, and the pivot holder 12 is made of a metal such as aluminum. The sleeves 18 are made of a synthetic resin.

Figure 5:
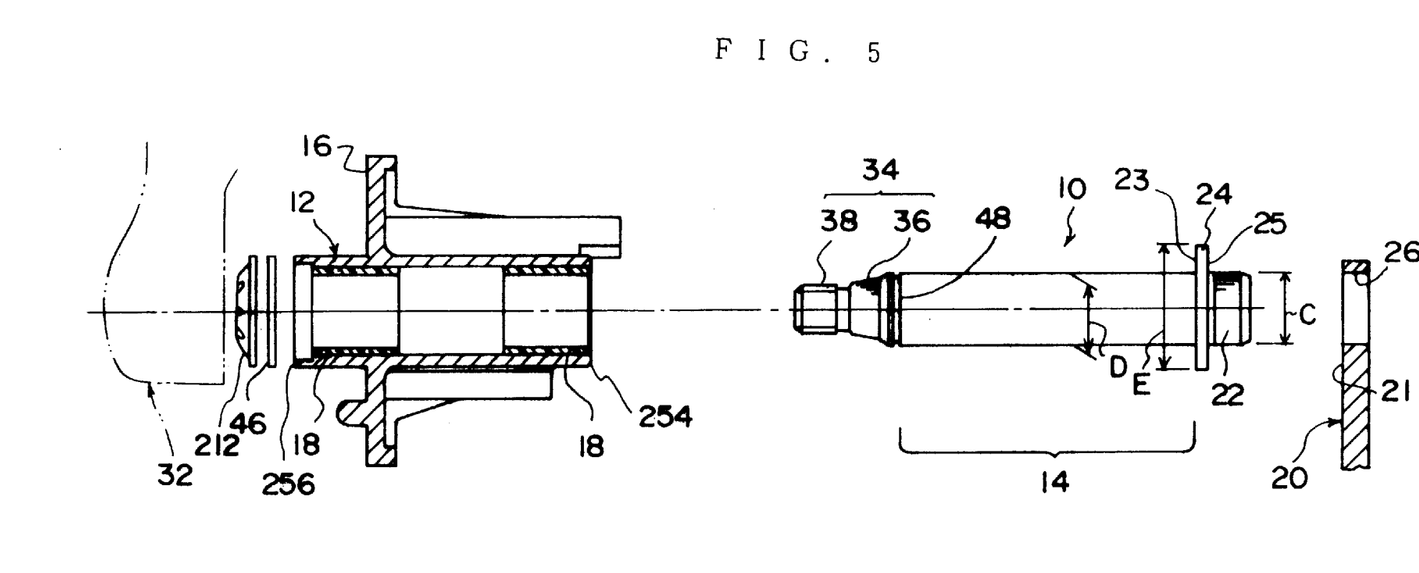
FIG. 5 depicts a second embodiment of the wiper pivot shaft and the wiper apparatus of the present invention and is a partially sectioned and exploded front view of the main portion thereof.

In the above-described first embodiment, the wave washer 40 and the plain washer 42 are disposed on the shaft 10 to be interposed between the first opening of the pivot holder 12 and the second end surface 23 of the flange portion 24; however, as shown in FIG. 5, they are not provided in the present embodiment. As shown in FIG. 6, the second end surface 23 of the flange portion 24 directly abuts the first opening of the pivot holder 12 to thereby determine the amount of insertion of the shaft 10 into the pivot holder 12.

Further, in the above-described first embodiment, the C-ring 44 is fitted in the engagement groove 48 of the shaft 10 located between the support portion 14 and the wiper-arm-mating portion 34; however, as shown in FIG. 5, a teeth washer (toothed washer) 212 is provided as a retaining member in place of the C-ring 44 and the engagement groove 48. As shown in FIG. 6, the teeth washer 212 is pressfitted onto the periphery of the shaft 10 and abuts the second opening of the pivot holder 12 via the plain washer 46. Through use of the teeth washer 212, the shaft 10 is prevented from coming off, and the axial play of the shaft 10 is prevented.

In view of the fact that through attainment of a high degree of perpendicularity for the angle e between the link lever 20 and the shaft 10, uneven sliding contact is prevented between the first opening end of the pivot holder 12 and the link lever 20 opposed thereto, as described above in the description of the first embodiment, in the configuration of the present embodiment, the second end surface 23 of the flange portion 24 directly abuts the first opening of the pivot holder 12, thus omitting a wave washer and a plain washer from therebetween.

As a wave washer and a plain washer are omitted, the number of parts decreases accordingly, so that costs are reduced.

Figure 6:
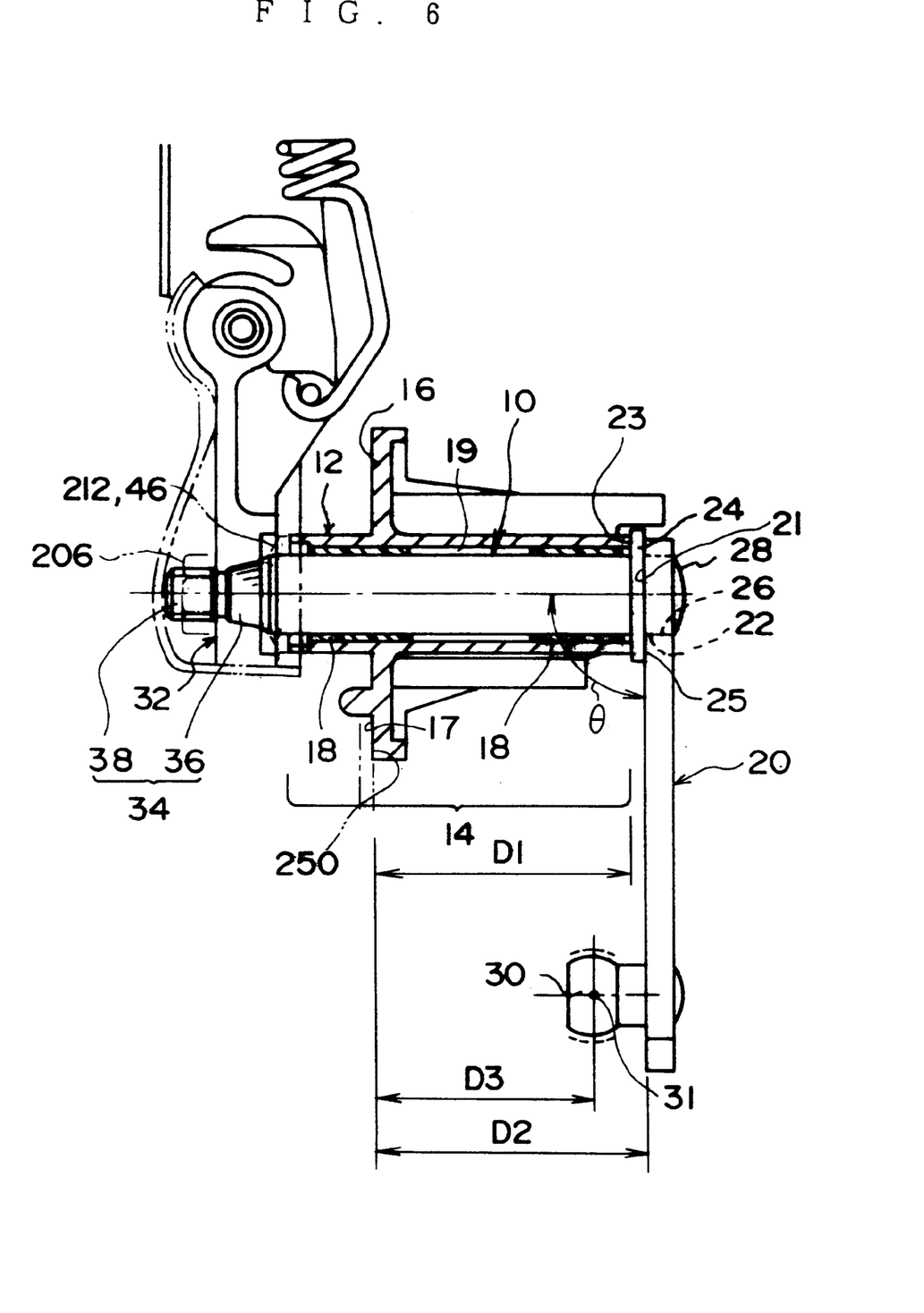
FIG. 6 depicts the second embodiment and is a partially sectioned front view of the second embodiment showing the assembled state of the main portion thereof.

As shown in FIG. 6, particularly, since the amount of insertion of the shaft 20 is determined through direct abutment of the second end surface 23 of the flange portion 24 against the first opening of the pivot holder 12, there becomes further accurately constant the dimension D1 between the mating surface 17 of the attachment flange 16 of the pivot holder 12 for attachment to the vehicle body 250 and the second end surface 23 of the flange portion 24. Accordingly, there becomes further accurately constant the dimension D2 between the mating surface 17 of the attachment flange 16 and the side surface 21 of the link lever 20 located on the side of the flange portion 16. Also, the dimension D3 between the mating surface 17 of the attachment flange 16 and the pivotal point 31 of the pivot 30 of the link lever 20 is stabilized further accurately to a previously set dimension.

Next, a third embodiment will be described with reference to FIGS. 7 and 8.

In the present embodiment, the shaft 10 is made of a metal, while the pivot holder is made of a synthetic resin.

In the first and second embodiments, the sleeves 18 are interposed between the pivot holder 12 and the shaft 10, and the outer circumferential surface of the shaft 10 slidably contacts the inner circumferential surfaces of the sleeves 18. However, in the present embodiment, as shown in FIG. 7, no sleeve is present between the pivot holder 12 and the shaft 10. As shown in FIG. 8, the outer circumferential surface of the shaft 10 directly contacts the inner circumferential surface of the pivot holder 12 in a slidable manner.

Since the pivot holder 12 is made of a synthetic resin, while the shaft 10 is made of a metal, even when no sleeve is provided therebetween, the sliding contact between the shaft 10 and the pivot holder 12 is free from problems of wear and sliding noise which would be induced from the sliding contact between metallic parts.

Figure 7:
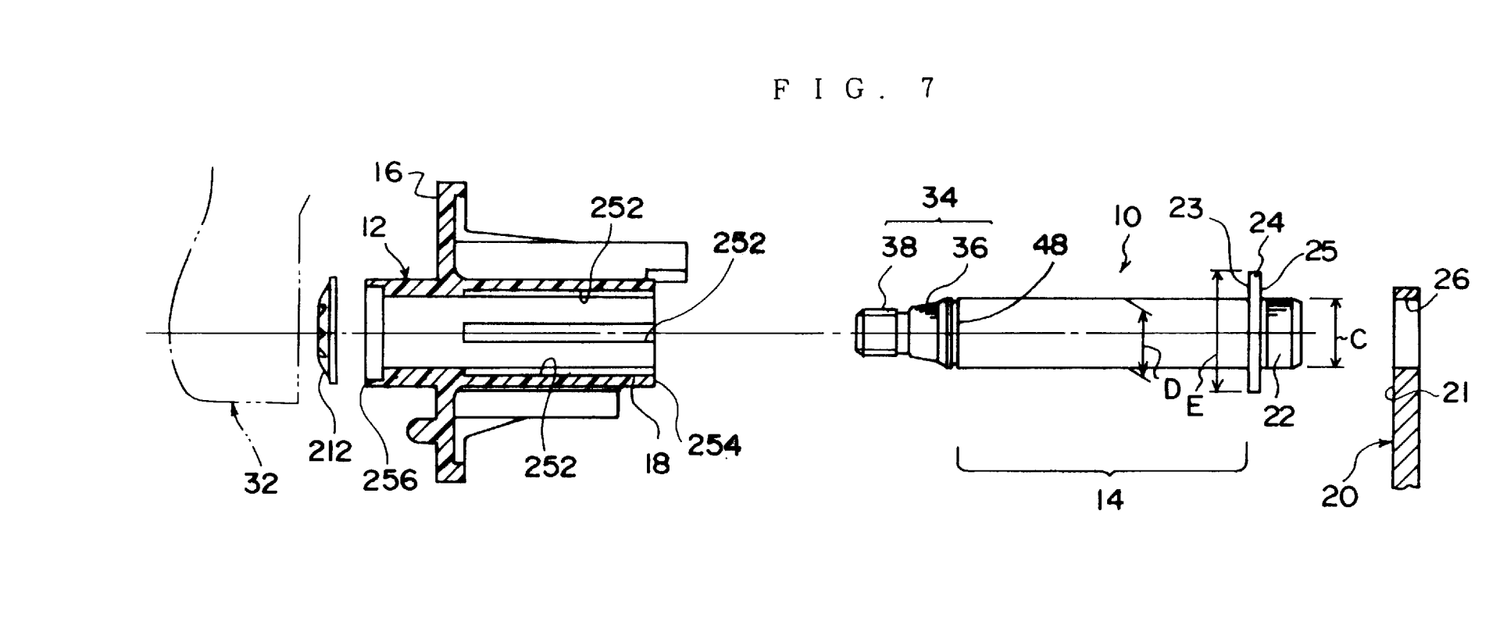
FIG. 7 depicts a third embodiment of the wiper pivot shaft and the wiper apparatus of the present invention and is a partially sectioned and exploded front view of the main portion thereof.
Figure 8:
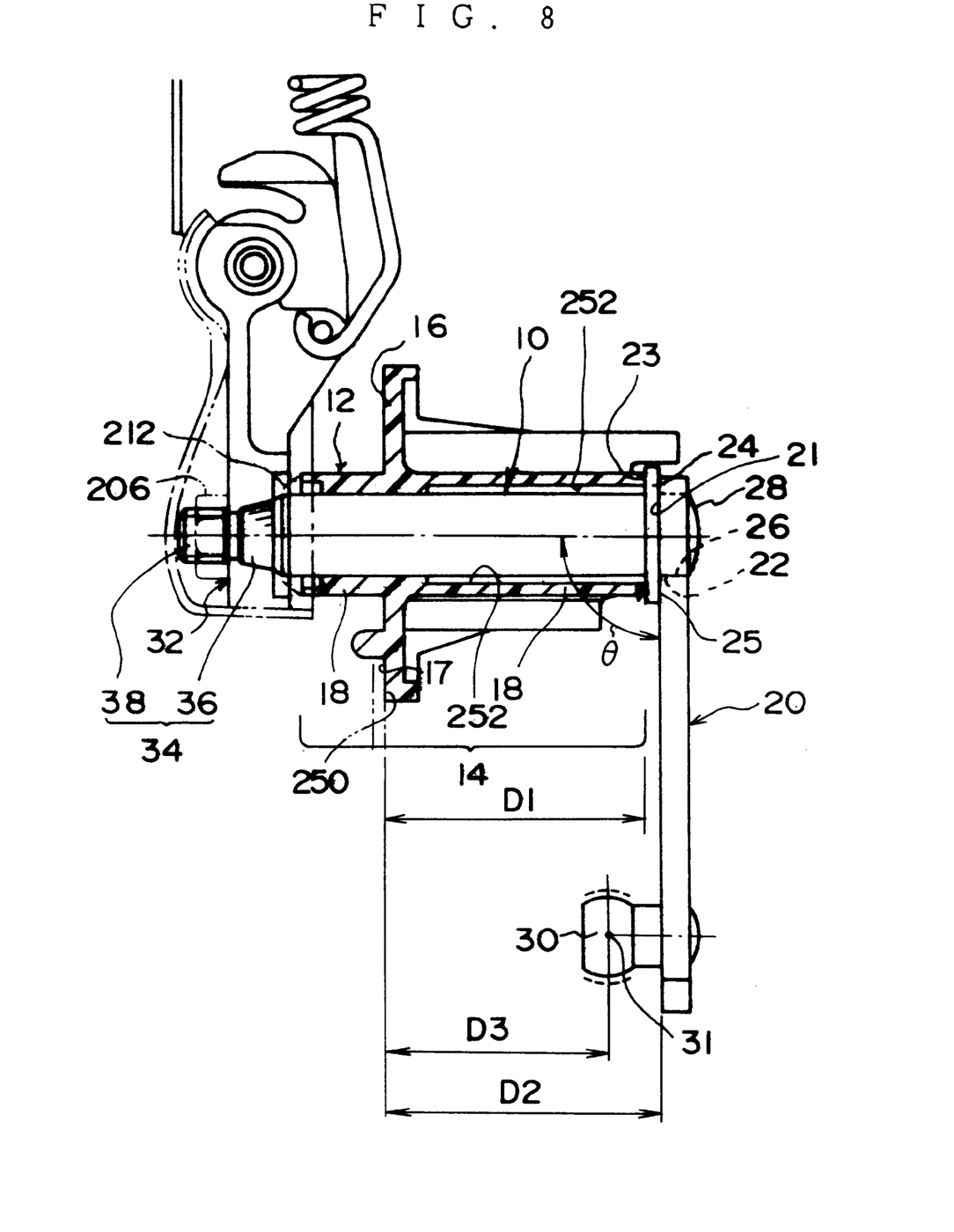
FIG. 8 depicts a partially sectioned front view of the third embodiment showing the assembled state of the main portion thereof.

As shown in FIG. 7, a plurality of grooves 252 are formed in the inner circumferential surface of the pivot holder 12. The grooves 252 are circumferentially arranged at predetermined intervals and extend elongatively along the axial direction of the pivot holder 12 from the axially intermediate portion of the pivot holder 12 to the first opening of the pivot holder 12. The grooves 252 serve as grease pockets (lubricating fluid pockets) for grease with which the outer circumferential surface of the shaft 10 is lubricated.

Also, in the present embodiment, in view of the fact that as in the second embodiment, a high degree of perpendicularity is attained for the angle θ between the link lever 20 and the shaft 10, the second end surface 23 of the flange portion 24 directly abuts the first opening of the pivot holder 12, thus omitting a wave washer and a plain washer from therebetween.

Thus, as in the second embodiment, there are further accurately obtained the dimension D1 between the mating surface 17 of the attachment flange 16 of the pivot holder 12 for attachment to the vehicle body 250 and the second end surface 23 of the flange portion 24, and the dimension D2 between the mating surface 17 of the attachment flange 16 and the side surface 21 of the link lever 20 located on the side of the flange portion 24. Also, the dimension D3 between the mating surface 17 of the attachment flange 16 and the pivotal point 31 of the pivot 30 of the link lever 20 is stabilized further accurately to a previously set dimension.

Further, the teeth washer 212 directly abuts the second opening of the pivot holder 12 without a plain washer being present between the teeth washer 212 and the second opening of the pivot holder 12.

When both of the shaft 10 and the pivot holder 12 are made of a metal as in the first and second embodiments, a plain washer 46 is interposed between the metallic C-ring 44 or the metallic teeth washer 212 and the pivot holder 12 in order to prevent metallic part-to-metallic part sliding contact between the C-ring 44 or the teeth washer 212 and the second opening of the pivot holder 12, thereby reducing wear and sliding noise which would be induced from contact between metallic parts.

In the case where the pivot holder 12 is made of a synthetic resin as in the present embodiment, even when the metallic teeth washer 212 is brought in direct abutment against the second opening of the pivot holder 12, metal-to-synthetic resin contact is established between the teeth washer 212 and the second opening end of the pivot holder 12, thereby reducing wear and sliding noise which would be induced from sliding contact between metallic parts.

A wave washer and a plain washer are omitted from between the first opening of the pivot holder 12 and the second end surface 23 of the flange portion 24, and a plain washer is omitted from between the teeth washer 212 and the first opening of the pivot holder 12, the number of parts further decreases, so that costs are further reduced.

Other features of structure, action, and effect of the second and third embodiments are similar to those of the first embodiment.

INDUSTRIAL APPLICABILITY

As described above, a wiper pivot shaft and a wiper apparatus according to the present invention are usefully applicable to a shaft for transmitting a reciprocatively rotational torque from a link lever connected to a motor via a link mechanism to a wiper arm retaining a wiper blade as well as to a wiper apparatus for use in a vehicle or the like for wiping a glass surface with a wiper blade through reciprocative rotation of a wiper arm along the glass surface.

What is claimed is:

1. A wiper apparatus comprising:
a cylindrical pivot holder made of a synthetic resin and having an axial hole including a first opening at one end and a second opening at another end, the axial hole having a plurality of peripherally spaced grooves extending from an axial direction intermediate portion of the pivot holder to the first opening for containing lubricating fluid, each of said grooves having a uniform depth along its length;

a wiper pivot shaft made of a metal, having a support portion, a link-lever-attaching portion, a wiper-arm-mating portion, and a flange portion, said wiper pivot shaft being inserted through the axial hole of said pivot holder, and said support portion, said link-lever-attaching portion, said wiper-arm-mating portion and said flange portion being formed integrally by cold forging, said support portion forming an intermediate portion of said shaft being supported in said pivot holder, and having a predetermined diameter D;

said link-lever-attaching portion forming a first end portion of said shaft, projecting from the first opening of said pivot holder, and having a predetermined diameter C greater than the predetermined diameter D of said support portion;

said wiper-arm-mating portion forming a second end portion of said shaft and projecting from the second opening of said pivot holder;

said flange portion being provided between said support portion and said link-lever-attaching portion, said flange portion having a diameter E greater than the diameter of the raw material constituting said wiper pivot shaft before the cold forging and the diameter C of said link-lever-attaching portion, and projecting perpendicularly in an axial direction of said shaft as a result of the cold forging, wherein a first end surface of said flange portion opposes the first opening of said pivot holder;

a link lever that is adjacent to another end surface of said flange portion, said link lever being fitted onto a periphery of said link-lever-attaching portion in order to transmit a reciprocatively rotational torque to said wiper pivot shaft; and a wiper arm attached to said wiper-arm-mating portion so as to reciprocatively rotate together with said wiper pivot shaft.

2. A wiper apparatus as in claim 1, wherein the second end surface of said flange portion directly abuts the first opening of said pivot holder.

3. A wiper apparatus as in claim 1, further comprising a retaining member fitted onto a periphery of said shaft between said wiper-arm-mating portion and the second opening of said pivot holder such that the retaining member faces the second opening of said pivot holder, to thereby prevent said shaft from at least one of angular and axial displacement.

4. A wiper apparatus as in claim 1, wherein the second end surface of said flange portion directly abuts the first opening of said pivot holder, said apparatus further comprising a retaining member fitted to a periphery of said shaft between said wiper-arm-mating portion and the second opening of said pivot holder and which directly abuts the second opening of said pivot holder, to thereby prevent said shaft from at least one of angular and axial displacement.

5. A wiper apparatus as in claim 4, wherein said retaining member is a toothed washer.

6. A wiper apparatus as in claim 1, wherein an outer circumferential surface of said shaft slidably contacts an inner circumferential surface of said pivot holder to thereby allow said shaft to rotate and form a groove in the inner circumferential surface of said pivot holder so as to serve as a lubricating fluid pocket that contains a lubricating fluid for lubricating the slidably contacting outer circumferential surface of said shaft.

7. A wiper apparatus as in claim 1, wherein said pivot holder is fixed onto a vehicle body, said link lever is connected to a motor via a link mechanism, a rotary motion of the motor is converted to the reciprocatively rotational motion of said link lever by the link mechanism; and said wiper arm retains a wiper blade, and the wiper blade wipes a glass surface as said wiper arm reciprocatively rotates along the glass surface.

8. A wiper apparatus as in claim 7, wherein an attachment flange is formed on said pivot holder, the attachment flange attaches said pivot holder to the vehicle body.

9. A wiper apparatus as in claim 7, wherein a first end portion of said link lever is attached to said link-lever-attaching portion, and a pivot to be connected to said link mechanism is provided on the second end portion of said link lever.

10. A wiper apparatus as in claim 1, wherein said link has an engagement hole formed therein; and said link-lever-attaching portion is press-fitted into the engagement hole.

11. A wiper apparatus as in claim 10, wherein the link-lever-attaching portion is knurled.

12. A wiper apparatus as in claim 1, wherein said wiper-arm-mating portion comprises a tapered portion and an externally threaded portion and said wiper arm is attached to said wiper-arm-mating portion through engagement of said wiper arm with the tapered portion and through screw engagement of a nut with the externally threaded portion.

* * * * *